Aug. 6, 1968   R. H. SMITH   3,395,663
DEEP SEA REFUSE DISPOSAL
Filed Feb. 20, 1967   2 Sheets-Sheet 1
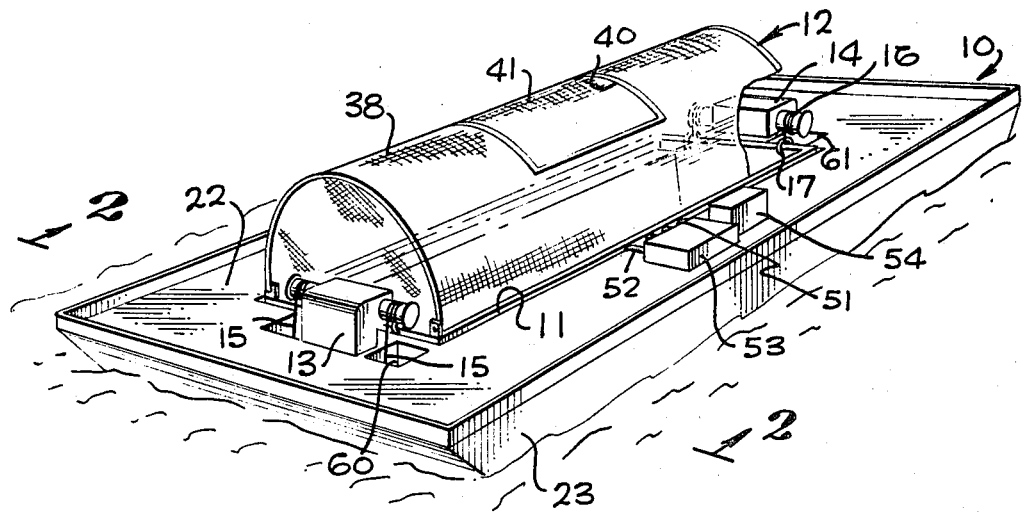
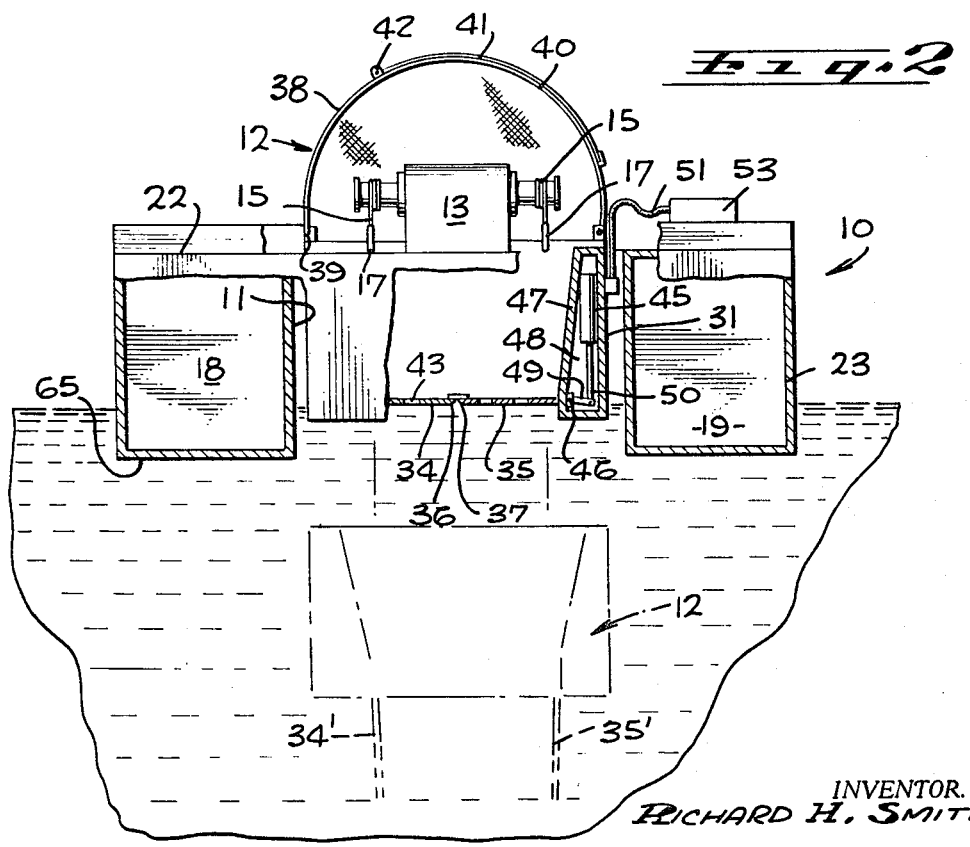
INVENTOR.
RICHARD H. SMITH
BY
Beehler & Arant
ATTORNEYS Aug. 6, 1968  R. H. SMITH  3,395,663
DEEP SEA REFUSE DISPOSAL
Filed Feb. 20, 1967  2 Sheets-Sheet 2
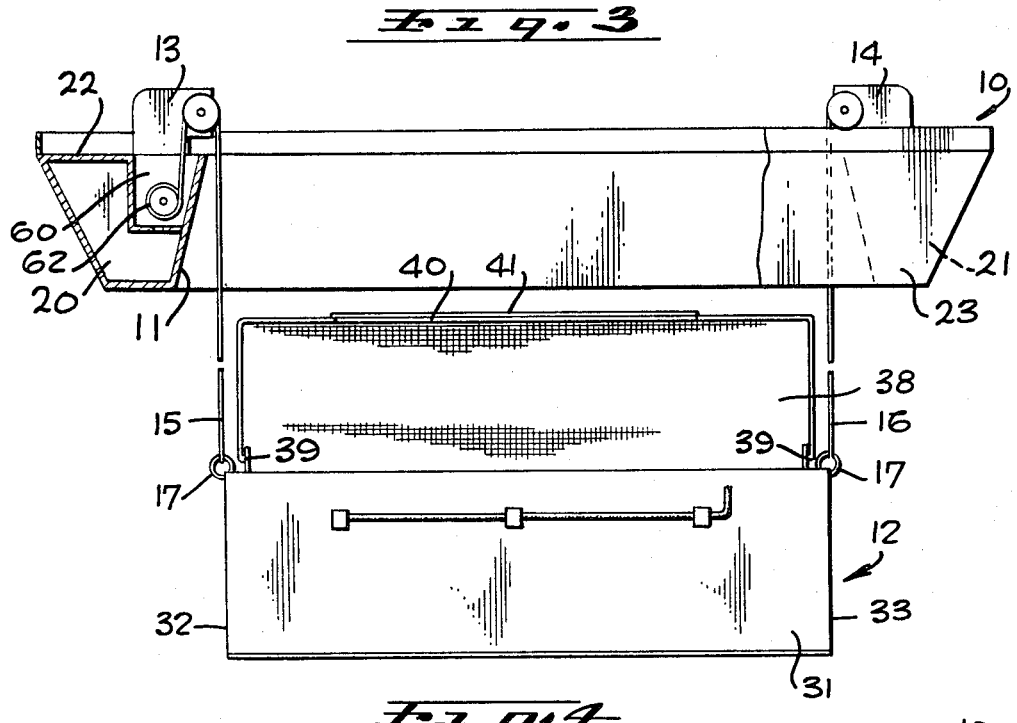
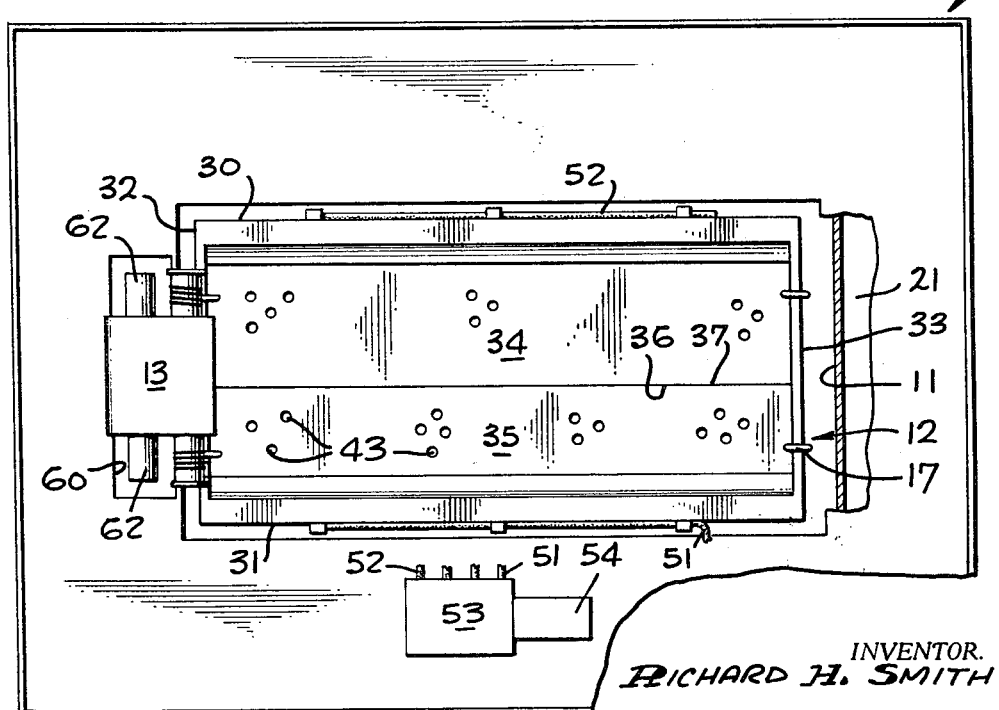
INVENTOR.
RICHARD H. SMITH
BY
Beehler & Arant
ATTORNEYS United States Patent Office 3,395,663
Patented Aug. 6, 1968

3,395,663
DEEP SEA REFUSE DISPOSAL
Richard H. Smith, San Mateo, Calif. (16831 Harkness Circle, Huntington Beach, Calif. 92647)
Filed Feb. 20, 1967, Ser. No. 617,309
6 Claims. (Cl. 114—28)

ABSTRACT OF THE DISCLOSURE

The invention relates to disposal at sea of material such as mixed trash or refuse of the character commonly collected in a community as household rubbish. More particularly, the invention relates to a means for submerging mixed refuse to a depth sufficient to render it nonbouyant and there dumping it so that the material will then sink to the ocean bottom.

In an embodiment of the invention which is illustrative of the apparatus, there is employed a barge equipped with a nonbouyant refuse container mounted in an open well in the barge. The container is swung on a pair of fore and aft windlasses by means of which it can be lowered into the water and subsequently raised therefrom. The container in turn is provided with a trap door at the bottom for dumping the contents and an open mesh dome over the top for confining loose, buoyant refuse material. Windlasses are employed to lower the container to a depth where the water pressure is sufficiently great to crush the cell walls of buoyant particles rendering them nonbuoyant whereupon the trap door is opened by appropriate remote control or automatic means, as the case may be, permitting the entire mass of material, now in a nonbuoyant condition, to be dumped downwardly into the ocean where it will fall to the bottom. The container is then raised by the windlasses into position on the barge, the trap door is closed, and the apparatus then returned for another load.

As refuse heretofore has been disposed at sea, a customary expedient has been to load it on barges, then tow it far enough out to sea so that after being dumped it will not be a nuisance, even though much of it may float, either temporarily or permanently, or until broken up by the waves or otherwise disintegrated. Where refuse has been of such character as not to lend itself to being dumped on the surface, containers have been used to confine the refuse until it has been submerged and falls to the ocean floor.

The foregoing method has many objections, one being that the trip out to sea to a location far enough to be out of the way is oftentimes considerable. This is expensive, and also very troublesome in rough weather. The second above mentioned method needs especially deep water and furthermore requires loading in a special container and the attendant wasteful cost of the container which is dumped along with the refuse.

It has been demonstrated that substantially all buoyant porous substances will become saturated and lose positive buoyancy if lowered to a certain depth in water. This depth depends upon the nature of the substance. For instance, most woods and paper will remain on the sea bottom, if lowered to a depth of 200 feet. Green or fresh vegetable matter, including ordinary household garbage, will not float below a depth of 50 feet. Closed bottles will collapse at various depths and open containers of any description will have their air pockets compressed to a point where the containers lose positive buoyancy. In fact, almost all solids except for a few certain hydrocarbons and polymers whose specific gravity is less than 1.0 will remain under water if lowered deep enough.

It is therefore among the objects of the invention to provide a new and improved apparatus for the disposal of refuse of all kinds at sea with no evidence of the refuse being left upon the surface.

Another object of the invention is to provide a new and improved apparatus for the direct disposal of all kinds of refuse, both buoyant and nonbuoyant, at depths assuring prompt deposit on the bottom of the sea.

Still another object of the invention is to provide a new and improved apparatus for the deposit of buoyant and nonbuoyant refuse at sea at depths assuring continued submergence.

Still further among the objects of the invention is to provide a new and improved apparatus for the deposit of all kinds of refuse on the sea bottom without need for disposable containers or accompanying nonbuoyant material to hold the buoyant material submerged.

Also included among the objects of the invention is to provide a new and improved disposal unit for depositing loose refuse of all kinds at a depth assuring submergence, and subsequent retrieval of the disposal unit for reuse.

Included further among the objects of the invention is to provide a simple refuse disposal unit in which refuse can be made nonbuoyant by water pressure when sunk to adequate depths, the unit being such that it can be dumped either automatically or by remote control at the proper depth, after being held long enough to render all of the material nonbuoyant, the unit furthermore being so designed that any chance buoyant material which might not be rendered nonbuoyant is properly confined within the unit until it is returned to the surface for reloading.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 1 is a perspective view of the sea going assembly showing a refuse container mounted in place upon a barge.

FIGURE 2 is a cross-sectional view taken on the line 2—2 of FIGURE 1.

FIGURE 3 is a side elevational view partially in section showing the container in a condition of partial submergence.

FIGURE 4 is a plan view partially in section of the barge and accompanying refuse containing unit, showing the refuse container unit uncovered for loading.

In an embodiment of the invention chosen as a typical illustration there is shown a vessel which here takes the form of a barge indicated generally by the reference character 10 provided with an open rectangular bottomless well 11 within which is suspended a refuse containing unit or container indicated generally by the reference character 12. Power windlasses 13 and 14 are located at respective ends of the barge and appropriate cables 15 and 16 on their respective windlasses are attached to rings 17 on the ends of the container so that the container may be lowered, dumped and subsequently be raised.

Further by way of example, the vessel or barge 10 has buoyant compartments 18 and 19 joined at opposite ends by portions 20 and 21 and covered over with a common deck 22. A hull 23 supports the deck and forms the exterior walls of the compartments located therein. Presumably, the vessel could be motor powered but simple barges adapted for towing are commonly the most expedient.

The container 12 has side walls 30 and 31 and end walls 32 and 33. A substantial portion of the bottom of the container 12 is formed by two horizontal trap doors 34 and 35. These doors are hinged along the bottom edges respectively of side walls 30 and 31 and have adjacent overlapped sealing edges 36 and 37.

Extending over the top of the container 12 is a dome 38 of relatively heavy open wire mesh. The dome 38 is shown hinged at 39 so that the entire dome can be tilted free to open position if need be for loading. A hatch opening 40 is provided on the upper side of the dome 38, the hatch being normally closed by a wire mesh hatch cover 41 hinged at 42. Holes 43 admit water into the interior of the container 12.

For opening and closing the trap doors 34 and 35 there are provided hydraulic rams 45, one of which is shown in FIGURE 2 for operating the trap door 35. The door is hinged at 46 to a compartment wall 47 of the container 12. The compartment wall forms a substantially sealed compartment 48 in which the rams are located, on each side. A lever 49 connected to a piston 50 serves to operate the door. As many rams as may be required may be operatively connected to each door to operate in the manner described. Hydraulic hoses 51 and 52 are connected from the respective rams to reels (not shown) and then to a hydraulic reservoir 53 on the deck 22. A suitable pump 54 is operatively connected to the reservoir to supply power.

Wells 60 and 61 are provided for the respective cables 15 and 16, wound on take-up drums 62 so that a sufficient length of cable can be stored to accommodate lowering the container to the desired depths.

In use, the barge is first towed to an appropriate dock, together with the container, the hatch cover 41 opened and the container thereafter filled with mixed disposable refuse. After the hatch cover 41 has been closed and made fast, the barge is then floated out to sea to a location where the depth of the water is preferably in excess of 50 feet or perhaps substantially greater than that, depending upon the type of refuse to be disposed of. The barge is then moved to a suitable location and the container lowered into the sea by use of the windlasses to a selected depth. Should the refuse be all garbage, a 50 foot depth would probably be adequate for the major portion of it. If the refuse were mixed refuse, containing wood and other buoyant objects, the depth should be substantially greater and, on occasions as great as 200 feet. The precise depth is somewhat empirical depending upon the type of refuse being handled. Also how long the container should be held suspended at a particular depth depends upon the mixture of refuse in it and this should be long enough to collapse the cell walls of all of the objects and materials being disposed of.

After a sufficient lapse of time the trap doors are opened by remote control from the deck at which time, assisted by the weight of the refuse on the trap doors, they will swing down to the broken line positions 34' and 35' of FIGURE 2, thereby dumping all of the contents into the ocean. Although a manual control has been described, it will be understood that pressure sensitive controls are contemplated which will release automatically at a selected depth.

Should not all of the buoyant refuse be made nonbuoyant, any refuse remaining after opening of the trap doors merely floats to the top of the dome 38 where it stays until the container is returned to the surface for reloading. This material may then be cleaned out if preferred or returned with a new load of refuse to the dumping process, when it may then be made non-buoyant.

As a safety feature the windlasses 13 and 14 may be mounted at a location above the deck 22 high enough to lift the bottom of the container above the bottom level 65 of the hull 23 so that the doors 34 and 35 will not be damaged while open should the barge be towed to shallow water.

While the invention has herein been shown and described in what is conceived to be a practical and operable embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A deep sea refuse disposal unit comprising a buoyant vessel, a refuse container, said vessel having a station thereon with a downwardly opening portion for positioning said container on the vessel, said container being mounted on said vessel at a location over the sea, means on said vessel in cooperation with said container supporting said container at said station on said vessel, said means comprising a lowering mechanism including extension means whereby to lower said container to a depth at which buoyant refuse is rendered nonbuoyant by water pressure, said container comprising walls in fixed position forming a chamber of selected size and shape for reception of refuse and an opening in said chamber forming a loading hatch and bottom closure means on said container including operating means for opening said closure means whereby to release refuse from said container at said depth.

2. A deep sea refuse disposal unit according to claim 1 including a porous cover for said container for confining buoyant refuse in said container while being lowered into the sea.

3. A deep sea refuse disposal unit according to claim 1 including passage means through said closure means whereby to admit water into the container while the closure means remains closed.

4. A deep sea refuse disposal unit according to claim 1 including a vessel having a well therein open at the bottom to the sea and said container being located in said well.

5. A deep sea refuse disposal unit according to claim 1 wherein said lowering mechanism includes a power actuated element in operative relationship with said extension means whereby to lower said container to said depth and to lift said container to position on said vessel.

6. A deep sea refuse disposal unit according to claim 1 wherein said means for supporting said container on said vessel is at an elevation wherein the bottom of said container when in supported position on the vessel is at a location above the bottom of said vessel.

References Cited
UNITED STATES PATENTS

| | | | |
|---|---|---|---|
| 1,047,233 | 12/1912 | Jackson | 114—27 |
| 1,997,149 | 4/1935 | Lake | 114—16.5 |

FOREIGN PATENTS

| | | |
|---|---|---|
| 962,620 | 3/1948 | France. |
| 530,026 | 7/1955 | Italy. |

MILTON BUCHLER, *Primary Examiner.*

T. MAJOR, *Assistant Examiner.*